United States Patent
Han

(10) Patent No.: US 9,632,644 B2
(45) Date of Patent: Apr. 25, 2017

(54) MULTI-CHANNEL CONTACT SENSING APPARATUS

(71) Applicant: Samsung Electronics Co., Ltd., Gyeonggi-do (KR)

(72) Inventor: Dong-Kyoon Han, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 545 days.

(21) Appl. No.: 13/673,182

(22) Filed: Nov. 9, 2012

(65) Prior Publication Data

US 2013/0113743 A1 May 9, 2013

(30) Foreign Application Priority Data

Nov. 9, 2011 (KR) .................. 10-2011-0116650

(51) Int. Cl.
*G06F 3/046* (2006.01)
*G06F 3/041* (2006.01)

(52) U.S. Cl.
CPC ............ *G06F 3/046* (2013.01); *G06F 3/0416* (2013.01)

(58) Field of Classification Search
CPC .............................. G06F 3/0416; G06F 3/046
USPC .......................................... 345/179, 170–174
See application file for complete search history.

(56) References Cited

U.S. PATENT DOCUMENTS

| | | | | |
|---|---|---|---|---|
| 5,049,831 A * | 9/1991 | Westwick | .......... | H03H 11/1217 330/107 |
| 5,057,717 A * | 10/1991 | Kimura | .......... | H03G 7/001 327/351 |
| 5,412,559 A * | 5/1995 | Karasawa | .......... | H02M 7/217 327/104 |
| 5,691,658 A * | 11/1997 | Klein | .......... | H03F 3/265 327/104 |
| 6,166,766 A * | 12/2000 | Moore | .......... | H04N 5/3575 327/90 |
| 8,884,804 B1 * | 11/2014 | Majumdar | .......... | G04F 10/005 341/120 |
| 2005/0068309 A1 * | 3/2005 | Chang | .......... | G09G 3/3611 345/204 |
| 2007/0003054 A1 * | 1/2007 | Ransijn | .......... | H04M 3/005 379/413 |
| 2007/0074915 A1 * | 4/2007 | Chung | .......... | H03K 17/962 178/18.06 |
| 2007/0180281 A1 * | 8/2007 | Partovi | .......... | G06F 13/4072 713/320 |
| 2007/0205829 A1 * | 9/2007 | Kao | .......... | H03F 1/223 330/301 |
| 2007/0268272 A1 * | 11/2007 | Perski | .......... | G06F 3/044 345/173 |
| 2008/0062148 A1 | 3/2008 | Hotelling et al. | | |

(Continued)

*Primary Examiner* — Tony Davis

(74) *Attorney, Agent, or Firm* — The Farrell Law Firm, P.C.

(57) ABSTRACT

A multi-channel contact sensing apparatus includes a ground contact part, a loop unit including a transmitting sub-loop unit and a receiving sub-loop unit, a controller that controls by applying a transmission signal to the transmitting sub-loop unit, and receiving a reception signal from the receiving sub-loop unit, and a switch unit that prevents each of at least one loop of the transmitting sub-loop unit and at least one loop of the receiving sub-loop unit from being connected to the ground contact part during a first period. The multi-channel contact sensing apparatus simultaneously measures a finger touch input and a pen input.

18 Claims, 12 Drawing Sheets

(56) References Cited

U.S. PATENT DOCUMENTS

| | | | | |
|---|---|---|---|---|
| 2009/0009483 A1* | 1/2009 | Hotelling | G06F 3/0416 | 345/173 |
| 2009/0153152 A1* | 6/2009 | Maharyta | G01R 27/2605 | 324/684 |
| 2009/0267905 A1* | 10/2009 | Hsu | G06F 3/044 | 345/173 |
| 2009/0315602 A1* | 12/2009 | Meninger | H03K 5/02 | 327/171 |
| 2010/0033437 A1* | 2/2010 | Matsubara | G06F 3/044 | 345/173 |
| 2010/0066693 A1* | 3/2010 | Sato | G06F 3/044 | 345/173 |
| 2010/0188345 A1* | 7/2010 | Keskin | G06F 3/045 | 345/173 |
| 2010/0219864 A1* | 9/2010 | Farhat | G11C 27/026 | 327/96 |
| 2010/0244858 A1* | 9/2010 | Cormier, Jr. | | 324/678 |
| 2010/0328249 A1* | 12/2010 | Ningrat et al. | | 345/174 |
| 2010/0329158 A1* | 12/2010 | Sengupta | H03F 1/3211 | 370/278 |
| 2011/0084926 A1* | 4/2011 | Chang et al. | | 345/173 |
| 2011/0109568 A1* | 5/2011 | Wu | G06F 3/0412 | 345/173 |
| 2012/0062497 A1* | 3/2012 | Rebeschi | G06F 3/03545 | 345/174 |
| 2012/0062498 A1* | 3/2012 | Weaver | G06F 3/03545 | 345/174 |
| 2012/0062499 A1* | 3/2012 | Weaver | G06F 3/03545 | 345/174 |
| 2012/0119930 A1* | 5/2012 | Kumar | H03F 3/45475 | 341/118 |
| 2012/0154326 A1* | 6/2012 | Liu | G06F 3/0412 | 345/174 |
| 2012/0162132 A1* | 6/2012 | Chen | G06F 3/044 | 345/174 |
| 2012/0169400 A1* | 7/2012 | Liu | G06F 3/0416 | 327/517 |
| 2012/0262235 A1* | 10/2012 | Hoogzaad | H03F 3/4508 | 330/252 |
| 2013/0049713 A1* | 2/2013 | Ogawa | H03M 1/1019 | 323/234 |
| 2013/0124134 A1* | 5/2013 | Gohel | H03K 5/01 | 702/120 |

* cited by examiner

MULTI-CHANNEL CONTACT SENSING APPARATUS

PRIORITY

This application claims the priority under 35 U.S.C. §119(a) to Korean Patent Application assigned Serial No. 10-2011-0116650, which was filed in the Korean Intellectual Property Office on Nov. 9, 2011, the contents of which are incorporated herein by reference.

BACKGROUND OF THE INVENTION

1. Field of the Invention

The present invention relates generally to a multi-channel contact sensing apparatus, and more particularly, to a multi-channel contact sensing apparatus that simultaneously measures a finger touch input and a pen input.

2. Description of the Related Art

Research is actively being conducted on smart phones as the market associated with smart phones and touch screens has rapidly grown. To input a command associated with a smart phone or a touch screen, a user may designate an icon by designating, on a location of a display, a body portion of the user or an ElectroMagnetic Resonant (EMR) pen.

A touch sensor using a capacitance scheme that is based on the contact of a body portion of the user may respond to only the contact of a conductive object, and has sensitivity that is inversely proportional to the contact area of the conductive object. That is, a change in the capacitance that is a target of the sensor measurement is proportional to the contact area of the conductive object that is in contact with the touch screen. Accordingly, when the contact area is large, a change in a signal increases and thus, the sensor may sufficiently perform sensing. However, when the contact area is small, the probability of malfunction increases. The sensor has a sensitivity that is proportional to the contact area. Thus, a finger that provides a wide contact area with an electrode or a screen is primarily used as an input unit. Accordingly, when using an object other than a finger, such as a pen or a stylus, a contact area may need to be comparable to the contact area of the finger.

An apparatus that uses a pen or a stylus as an input unit may separately use a sensor device, in addition to an existing touch sensor for sensing a finger.

A conventionally used capacitance-type touch sensor is classified into two types based on the role of an electrode used for sensing and the number of electrodes. That is, a type that senses a change in the capacitance between a finger of the user and an electrode contained in a touch screen is referred to as a self capacitive sensing touch screen, and a type that senses variance in capacitance formed between two electrodes in two layers in a touch screen, the variance caused by the contact of the user, is referred to as a mutual capacitive sensing touch screen. The mutual capacitive sensing touch screen may have an advantage in that it may simultaneously recognize multiple contacts correctly. As such, this type of screen has become more freqently utilized.

FIG. 1 illustrates a conventional mutual type touch screen panel. Referring to FIG. 1, the conventional mutual type touch screen panel includes a first electrode layer 11 provided in a lower portion, and a second electrode layer 13 provided on a substrate 15 that is disposed at a distance away from an upper portion of the first electrode layer 11 and has a dielectric constant. The first electrode layer 11 and the second electrode layer 13 are equipped with a plurality of electrode lines that is provided in a cross array. On an upper portion of the touch screen panel, a tempered glass 17 for protecting the second electrode layer 13 is additionally provided.

The first electrode layer 11 is connected to a first circuit to apply a signal, in which case a capacitance is formed between the first electrode layer 11 and the second electrode layer 13 due to the signal, and the signal applied to the first electrode layer 11 through the capacitance is transferred to the second electrode layer 13 and is applied to a second circuit. In the second circuit, it is determined whether a change in the signal transferred from the second electrode layer 13 has occurred, whether a touch is input, and coordinates of a region where the touch is input.

In particular, referring to FIG. 2, when a touch input by a body of a user or a stylus pen 19 does not exist, the signal transferred from the second electrode layer 13 is identical to a reference signal 21. However, when a touch input by a body of the user or the stylus pen 19 exists, a change in a contact strength sensed by the second electrode layer 13 indicates the same pattern as a contact strength signal 22. A change in an amount of an electric field transferred from the second electrode layer 13 of a region where the touch of the body of the user or the touch of the touch stylus pen 19 is input may have a form of an output signal 23. That is, the output signal 23 may have a form that indicates a relatively lower value than a level in a period 24 where the touch input exists, since an amount of electric field coupled from the first electrode layer 11 to the second electrode layer 13 is decreased by the contact of the body of the user or a conductor.

Whether a touch is input is determined by determining the contact strength signal 22 obtained after the process in the second circuit, and coordinates of a region where the touch is input is determined.

A capacitance-type touch sensor, which is widely implemented as a user input device, uses a scheme that senses the variance in capacitance due to a contacted conductor. The scheme readily senses a contact target that has a large contact area and causes a large variance in capacitance, such as a finger, but may have difficulty sensing a pen tip or a stylus, which have a relatively smaller contact area. To improve sensitivity, a threshold level may need to be lowered so that the touch screen responds to a smaller signal change. However, when the threshold level is decreased when a signal to noise ratio greater than or equal to a set level is not secured, the probability of malfunction may increase. According to a method of amplifying a size of a signal, the level of noise may also be amplified unless a method that isolates a noise signal prior to the amplification is secured. Thus, no gain is obtained in terms of the signal to noise ratio, and improved sensitivity is not realized.

As described in the foregoing, the scheme that senses only the variance in capacitance based on a contact area of a conductor has difficulty in sensing an object with a small contact area such as a stylus. Thus, a separate scheme such as a magnetic resonant scheme may be utilized to sense the stylus.

The magnetic resonant scheme may separately require a different electrode device, sensing hardware, and sensing algorithm since the magnetic resonant scheme is different from a scheme for sensing a finger. Accordingly, there is a need in the art for a magnetic resonant scheme employing the proper components and algorithm.

SUMMARY OF THE INVENTION

Accordingly, an aspect of the present invention is to solve at least the above-described problems occurring in the prior art, and to provide at least the advantages described below.

Another aspect of the present invention is to provide a sensing apparatus that senses a finger touch input and a pen input through a single sensing hardware using a plurality of loops and a switch.

In accordance with an aspect of the present invention, a sensing apparatus includes a ground contact part, a loop unit including a transmitting sub-loop unit and a receiving sub-loop unit, a controller that controls by applying a transmission signal to the transmitting sub-loop unit, and receiving a reception signal from the receiving sub-loop unit, and a switch unit that prevents each of at least one loop of the transmitting sub-loop unit and each of at least one loop of the receiving sub-loop unit from being connected to the ground contact part during a first period, and the controller controls by connecting, to the ground contact part, a plurality of loops of the transmitting sub-loop unit and a plurality of loops of the receiving sub-loop unit during a second period.

In accordance with another aspect of the present invention, a location sensing module that is connected to a sensing loop and determines an input location based on a single-ended reception signal from the sensing loop, includes a differential signal converting unit that converts the single-ended reception signal into two differential signals that are inverted to each other and output the two differential signals, a differential rectifying unit that outputs two rectified signals by rectifying the two differential signals, and a calculator that determines an input location of the sensing loop based on a strength difference between the two rectified signals.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
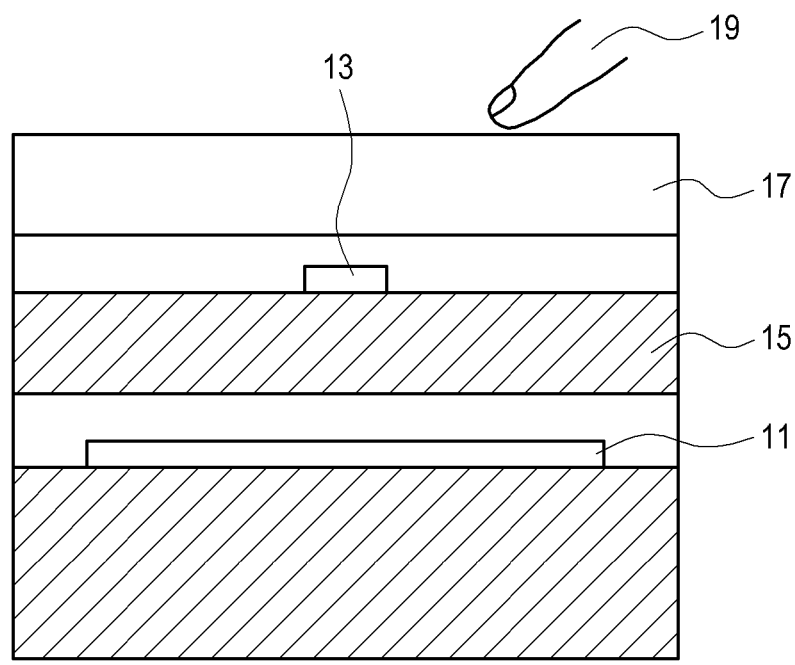
FIG. 1 illustrates a conventional mutual type touch screen panel.
Figure 2:
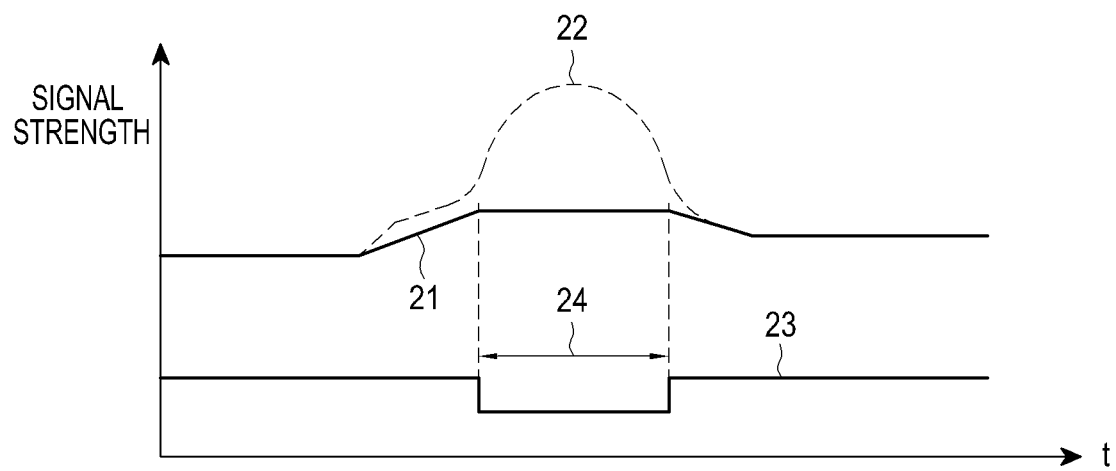
FIG. 2 illustrates a signal sensed in an electrode layer of a conventional touch sensor device.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted for the sake of clarity and conciseness.

Figure 3:
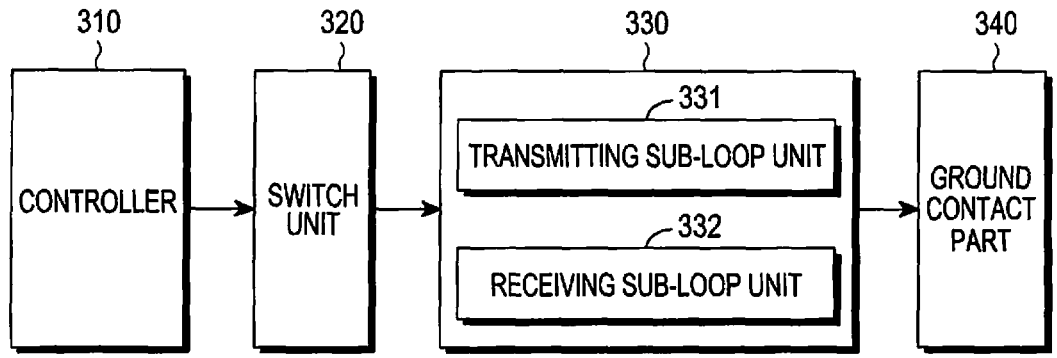
FIG. 3 illustrates a sensing apparatus according to an embodiment of the present invention.

FIG. 3 illustrates a sensing apparatus according to an embodiment of the present invention.

As illustrated in FIG. 3, the sensing apparatus includes a controller 310, a switch unit 320, a loop unit 330, and a ground contact part 340. The loop unit 330 includes a transmitting sub-loop unit 331 and a receiving sub-loop unit 332.

The controller 310 controls general operations of the sensing apparatus. The controller 310 applies, to the transmitting sub-loop unit 331 included in the loop unit 330, a transmission signal having a voltage or current. The controller 310 receives a reception signal input through the receiving sub-loop unit 332, and determines an input location or a magnitude of an input pressure of an input signal, for example, a finger touch input or a pen input, based on the input reception signal. The finger touch input may include proximity of a body portion of a user, such as a finger and a touch, and movement after the touch, such as dragging. The pen input corresponds to, for example, an input by an EMR pen or by a stylus using an electric field.

The controller 310 controls the sensing apparatus to sense a finger touch input during a first period, and controls the sensing apparatus to sense a pen input during a second period. In particular, the controller 310 controls the switch unit 320 so that a plurality of loops of the transmitting sub-loop unit 331 connected to the switch unit 320 are not connected to the ground contact part 340 during the first period. The controller 310 controls the switch unit 320 so that a plurality of loops of the receiving sub-loop unit 332 connected to the switch unit 320 are not connected to the ground contact part 340 during the first period.

During the first period, the plurality of loops of both the transmitting sub-loop unit 331 and of the receiving sub-loop unit 332 are not connected to the ground contact part 340, and are connected to the controller 310 at distance intervals. The connection state of the plurality of loops included in the transmitting sub-loop unit 331 and the receiving sub-loop unit 332 will be described in detail later herein.

During the second period, the controller 310 controls the switch unit 320 so that the plurality of loops of the transmitting sub-loop unit 331 and of the receiving sub-loop unit 332 are connected to the ground contact part 340.

The controller 310 applies a transmission signal to the transmitting sub-loop unit 331 during the first period, and the plurality of loops that are included in the transmitting sub-loop unit 331 and that are not connected to each other outputs an electric field based on the transmission signal, which includes a frequency component sensitively affected by the proximity and the contact of a finger due to the interaction that is affected by physical measurements, such as a size, a width, an electrode interval, and a number of loop coils, of the transmitting sub-loop unit 331 and the receiving sub-loop unit 332.

The controller 310 receives an input of a reception signal that is received by the receiving sub-loop unit included in the receiving sub-loop unit 332, during the first period.

When an area input such as a finger touch from an external side exists, a transmission signal from the transmitting sub-loop unit 331 is affected, which changes a reception signal received in the receiving sub-loop unit 332. The controller 310 determines a location of the area input, proximity, and movement, based on the change in the reception signal. For example, the controller 310 determines that a finger touch exists near a loop in which a strength of a reception signal is decreased from among the plurality of loops of the receiving sub-loop unit 332.

The controller 310 senses a pen input based on an EMR scheme during the second period. The user may approach or touch a passive or active EMR pen to a location during the second period. The controller 310 applies a transmission signal to the transmitting sub-loop unit 331 during a first sub-period of the second period. The transmitting sub-loop unit 331 outputs an electromagnetic field based on the transmission signal. The electromagnetic field is received by the EMR pen and the EMR pen outputs a reception signal. The controller 310 controls the receiving sub-loop unit 332 to receive a reception signal during a second sub-period of the second period, and determines, based on the reception signal received by the receiving sub-loop unit 332, information such as a location of a pen, movement, and a writing pressure such as touch pressure. The architecture for this determination will be described in detail later herein.

The controller 310 is embodied as a microprocessor, an integrated circuit, or a mini-computer, and those skilled in the art may readily understand that any unit that is capable of performing the described calculation process is used. The switch unit 320 is embodied as a load switch that performs switching, a free-wheeling switch, an N-type Metal Oxide Semiconductor (NMOS) device or a P-type Metal Oxide Semiconductor (PMOS) device. When the switch unit 320 is embodied as an NMOS device or a PMOS device, opening/closing is determined by an applied gate voltage output from the controller 310. In particular, when the switch unit 320 is embodied as an NMOS device, the switch unit 320 may additionally include a bootstrapping unit. The loop unit 330 is equipped with the transmitting sub-loop unit 331 and the receiving sub-loop unit 332, independently. Each sub-loop unit may include a plurality of loops which are connected to a channel.

Figure 4A:
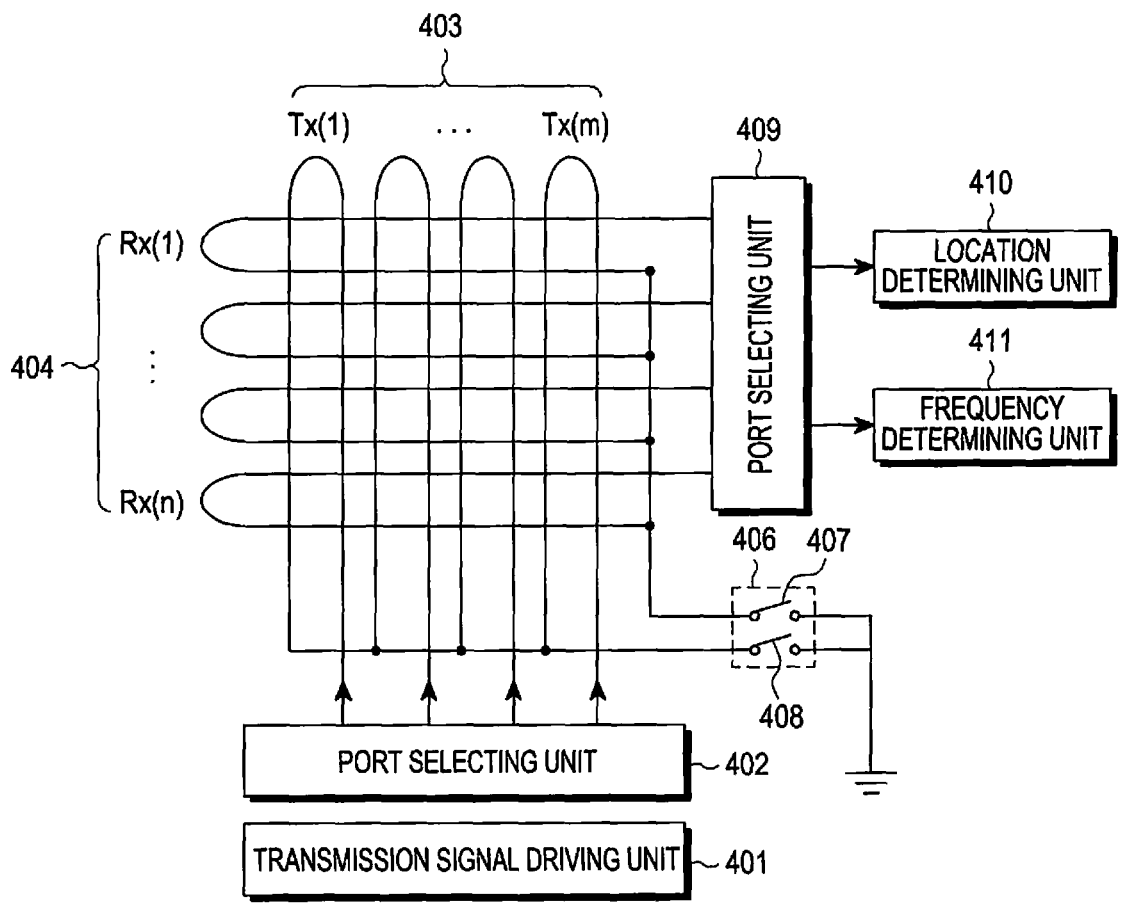
FIG. 4A illustrates a sensing apparatus that senses a finger touch input during a first period according to an embodiment of the present invention.

FIG. 4A illustrates a sensing apparatus that senses a finger touch input during a first period according to an embodiment of the present invention.

As illustrated in FIG. 4A, the sensing apparatus includes a transmission signal driving unit 401, a port selecting unit 402, a transmitting sub-loop unit 403, a receiving sub-loop unit 404, a switch unit 406, a port selecting unit 409, a location determining unit 410, and a frequency determining unit 411. The transmitting sub-loop unit 403 includes a plurality of loops Tx(1), . . . , Tx(m), and the receiving sub-loop unit 404 includes a plurality of loops Rx(1), . . . , Rx(n). The switch unit 406 includes a first switch 408 and a second switch 407. The transmission signal driving unit 401, the port selecting unit 402, the port selecting unit 409, the switch unit 406, the location determining unit 410, and the frequency determining unit 411 may be embodied as a single piece of hardware, such as a controller.

The transmission signal driving unit 401 applies, to the transmitting sub-loop unit 403, a transmission signal of a frequency component for sensing a finger. The transmission signal driving unit 401 drives a transmission signal having a frequency component and a voltage or current. When a controller is embodied as an integrated circuit, the transmission signal driving unit 401 is embodied as a voltage applying unit or a driving unit in the integrated circuit.

The port selecting unit 402 that receives an input of the transmission signal from the transmission signal driving unit 401 selects at least one of the plurality of loops Tx(1), . . . , Tx(m) of the transmitting sub-loop unit 403 and outputs the transmission signal.

At least one of the plurality of loops Tx(1), . . . , Tx(m) of the transmitting sub-loop unit 403 outputs an electric field, based on the input transmission signal. In particular, when the transmission signal is applied to the transmitting sub-loop unit 403, at least one of the plurality of loops Tx(1), . . . , Tx(m) has an electric potential and the electric field is formed by at least one of the plurality of loops Tx(1), . . . , Tx(m).

The receiving sub-loop unit 404 receives the electric field input from the plurality of loops Tx(1), . . . , Tx(m) as a reception signal. The receiving sub-loop unit 404 outputs the input reception signal to the port selecting unit 409, which outputs the reception signal to the location determining unit 410 or the frequency determining unit 411.

The location determining unit 410 determines an input location of an area input such as a finger touch, based on the reception signal input from the port selecting unit 409. An example in which a user touches Rx(n) with a body portion will be described. When the reception signal associated with the electric field output from the transmitting sub-loop unit 403 is input to the plurality of loops Rx(1), . . . , Rx(n), a portion of the user, that is, a finger touch, affects the input of the electric field. In particular, the strength of the input electric field is decreased and the location determining unit 410 determines that the input location of the finger touch is Rx(n) based on the decrease in the strength of the reception signal in an Rx (n) port.

One end of the first switch 408 included in the switch unit 406 is connected to one end of each of the plurality of loops of the transmitting sub-loop unit 403, and the other end of the first switch 408 is grounded. The embodiment of FIG. 4A is associated with sensing a finger touch, and the first switch 408 is opened as illustrated in FIG. 4A. One end of the second switch 407 is connected to one end of each of the plurality of loops of the receiving sub-loop unit 404. The other end of the second switch 407 is grounded and may be opened during a period for sensing a finger touch, for example, the first period.

Figure 4B:
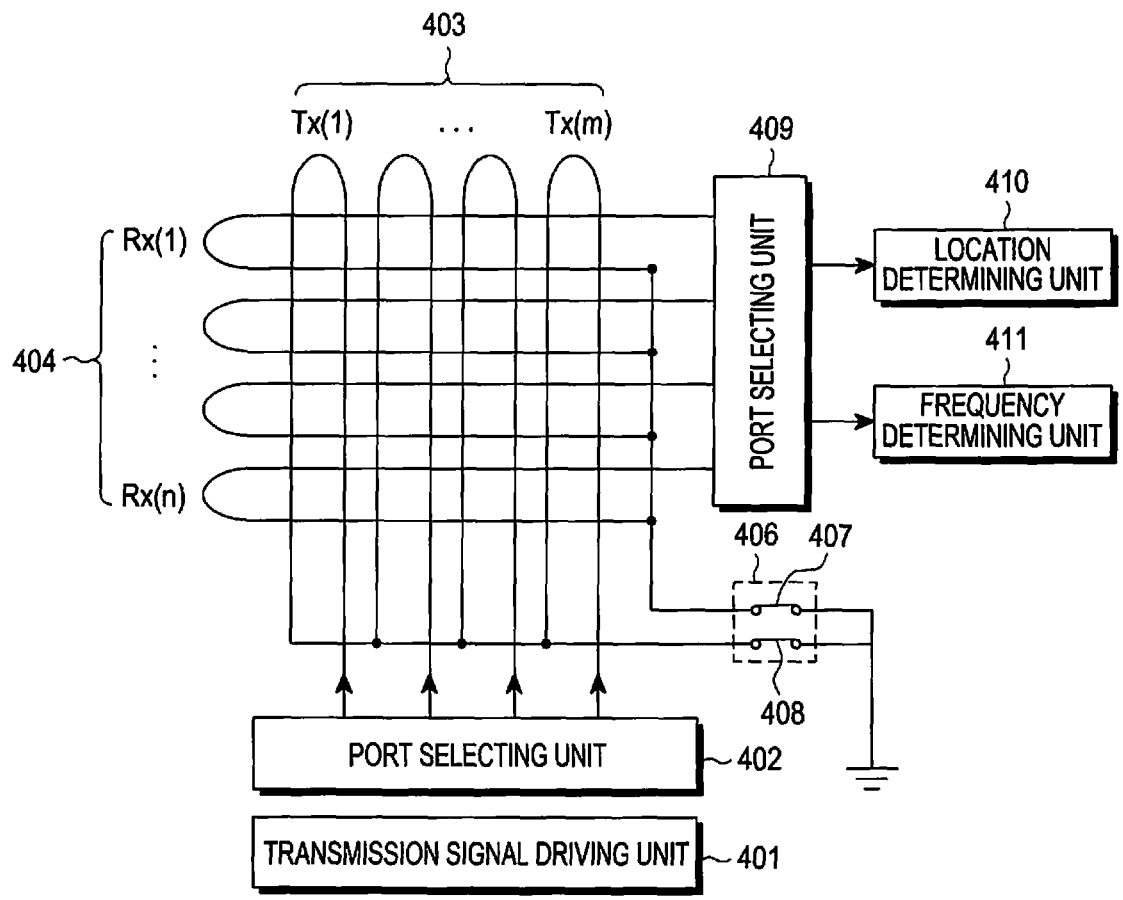
FIG. 4B illustrates a sensing apparatus that senses a pen input during a second period according to an embodiment of the present invention.

FIG. 4B illustrates a sensing apparatus that senses a pen input during a second period according to an embodiment of the present invention.

As illustrated in FIG. 4B, the sensing apparatus includes the transmission signal driving unit 401, the port selecting unit 402, the transmitting sub-loop unit 403, the receiving sub-loop unit 404, the switch unit 406, the port selecting unit 409, the location determining unit 410, and the frequency determining unit 411. The transmitting sub-loop unit 403 includes a plurality of loops Tx(1), ..., Tx(m), and the receiving sub-loop unit 404 includes a plurality of loops Rx(1), ..., Rx(n). The switch unit 406 includes a first switch 408 and a second switch 407. The transmission signal driving unit 401, the port selecting unit 4002, the switch unit 406, the port selecting unit 409, the location determining unit 410, and the frequency determining unit 411 may be embodied as a single piece of hardware, such as a controller.

The transmission signal driving unit 401 drives a transmission signal that flows through the transmitting sub-loop unit 403 during a first sub-period of the second period, and outputs the transmission signal to the port selecting unit 402. The transmission signal driving unit 401 drives a voltage or current, and is independently embodied as a current or voltage driving module, or as a current driving unit in an integrated circuit when a controller is embodied as the integrated circuit.

The port selecting unit 402 that receives an input of the transmission signal from the transmission signal driving unit 401 selects at least one of a plurality of loops Tx(1), ..., Tx(m) of the transmitting sub-loop unit 403 and outputs the transmission signal.

At least one of the plurality of loops Tx(1), ..., Tx(m) of the transmitting sub-loop unit 403 outputs an electric field based on the input transmission signal. In particular, when the transmission signal is applied to the transmitting sub-loop unit 403, the electric field is formed by at least one of the plurality of loops Tx(1), ..., Tx(m).

An EMR pen (not illustrated) receives an input of an induced electromagnetism, and outputs the electromagnetism.

The receiving sub-loop unit 404 receives, as a reception signal, an electromagnetism input from the EMR during a second sub-period of the second period, and outputs the input reception signal to the port selecting unit 409, which outputs the reception signal to the location determining unit 410 or the frequency determining unit 411.

The location determining unit 410 determines an input location of a pen input based on the reception signal input from the port selecting unit 409. The architecture in which the location determining unit 410 determines an input location of a pen input based on an input reception signal will be described in detail later herein. When a pen provides a contact, the frequency determining unit 411 determines a touch pressure based on frequency variation information that varies based on the contact.

One end of the first switch 408 included in the switch unit 406 is connected to one end of each of the plurality of loops of the transmitting sub-loop unit 403, and the other end of the first switch 408 is grounded. The embodiment of FIG. 4B is associated with sensing a pen input, and the first switch 408 is closed as illustrated in FIG. 4B. One end of the second switch 407 is connected to one end of each of the plurality of loops of the receiving sub-loop unit 404. The other end of the second switch 407 is grounded, and is closed during a period for sensing a pen input, for example, the second period.

As described in the foregoing, the architecture that applies a transmission signal and outputs an electromagnetism during a first sub-period of a second period through use of an EMR pen as a medium, and receives a reception signal during a second sub-period is merely an example. When an active pen and the like in addition to the EMR pen is used as a medium, the timing described in the foregoing is changed, which will be described in detail with reference to FIGS. 9A through 9D.

As described in the embodiments of FIGS. 4A and 4B, the sensing apparatus may not include a separate module for sensing a finger touch input and a pen input, but may sense a finger touch input and a pen input using a single loop and a single piece of hardware, thereby size-minimizing and lightening the sensing apparatus.

Figure 5:
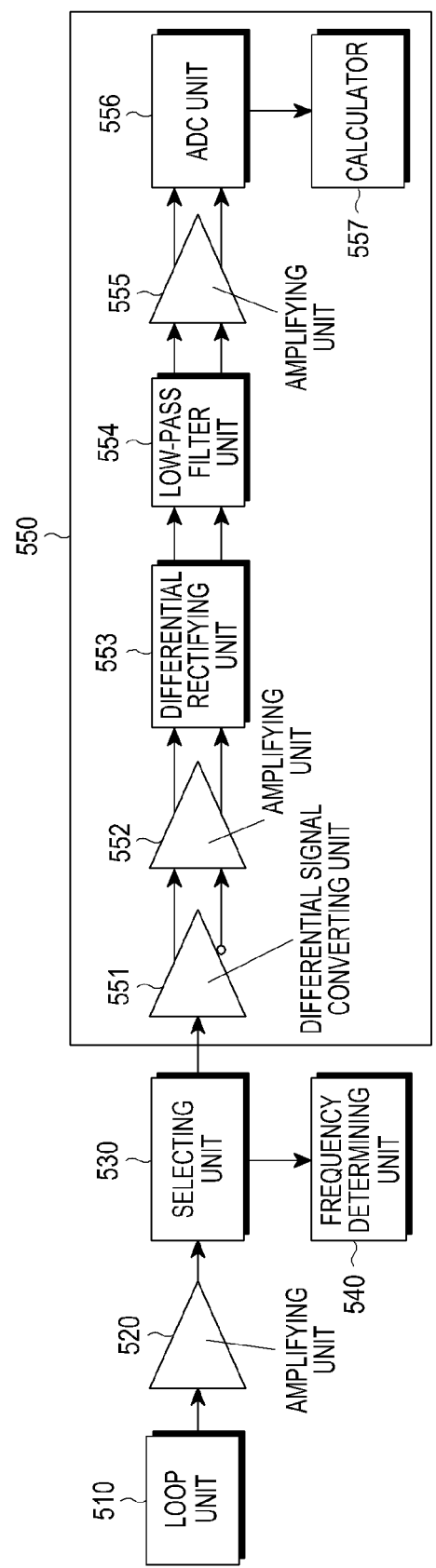
FIG. 5 illustrates a location determining unit and peripheral component elements according to an embodiment of the present invention.

FIG. 5 illustrates a location determining unit and peripheral component elements according to an embodiment of the present invention.

As illustrated in FIG. 5, a reception signal input from a loop unit 510 is output to an amplifying unit 520. The reception signal is assumed to be, for example, a pen input signal.

The amplifying unit 520, which is embodied as an OPeration AMPlifier (OP-AMP), a low-noise amplifier circuit, or a varied gain amplifier, for example, amplifies and outputs the input reception signal. Those skilled in the art will readily understand that any unit that is capable of amplifying a reception signal may be used.

A selecting unit 530 selects one of a frequency determining unit 540 and a location determining unit 550 for outputting the amplified reception signal. Outputting the amplified reception signal through one of the frequency determining unit 540 and the location determining unit 550 selected by the selecting unit 530 is merely an example, and the amplified reception signal may be output to both the frequency determining unit 540 and the location determining unit 550 and an input location of a pen input signal and a touch pressure may be simultaneously determined.

The frequency determining unit 540 determines a touch pressure by sensing a change in a frequency of a reception signal associated with a pen input, which will be described in detail later.

The location determining unit 550 includes a differential signal converting unit 551, an amplifying unit 552, a differential rectifying unit 553, a low pass filter unit 554, an amplifying unit 555, and an Analog-to-Digital Converter (ADC) unit 556.

The differential signal converting unit 551 converts an amplified reception signal in a form of a single ended signal into a differential signal. The differential signal may have, for example, a waveform of a square wave, and the differential signal converting unit 551 converts the single ended reception signal into two square waves for outputting. A sum of the two square waves corresponds to the single-ended reception signal or may have a difference of an offset from the single ended reception signal. The two differential signals may be a constant phase signal or an inverted phase signal based on a common mode voltage. The differential signal having a form of the square wave is merely an example, and those skilled in the art will readily understand that the differential signal may have any appropriate waveform.

The differential signal is input to the amplifying unit 552 and is amplified, and is rectified by the differential rectifying unit 553. Each of the differential signals amplified by the amplifying unit 552 is, for example, a square wave, and is rectified by the differential rectifying unit 553 to be a signal including a waveform having a voltage or current value. The amplifying unit 552 is embodied as, for example, a variable amplifier, and may differently control an amplification degree of the variable amplifier for each channel through a feedback route so as to adjust a deviation for each channel.

The low-pass filter unit 554 performs low-pass filtering on the two rectified signals and thus, a noise component included in the two signals is filtered.

The amplifying unit 555 amplifies the two low-pass filtered signals, and the ADC unit 556 converts the two low-pass filtered signals in an analog form into a digital signal and outputs the digital signal. The ADC unit 556 converts a difference of the differential signals and thus, removes a noise component commonly included in the differential signals.

The calculator 556 determines an input location of a pen input based on the output digital signal.

Figure 6A:
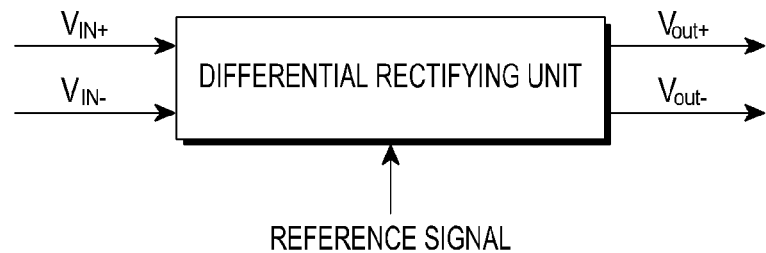
FIG. 6A illustrates a differential rectifying unit according to an embodiment of the present invention.

FIG. 6A illustrates a differential rectifying unit according to an embodiment of the present invention.

Figure 6B:
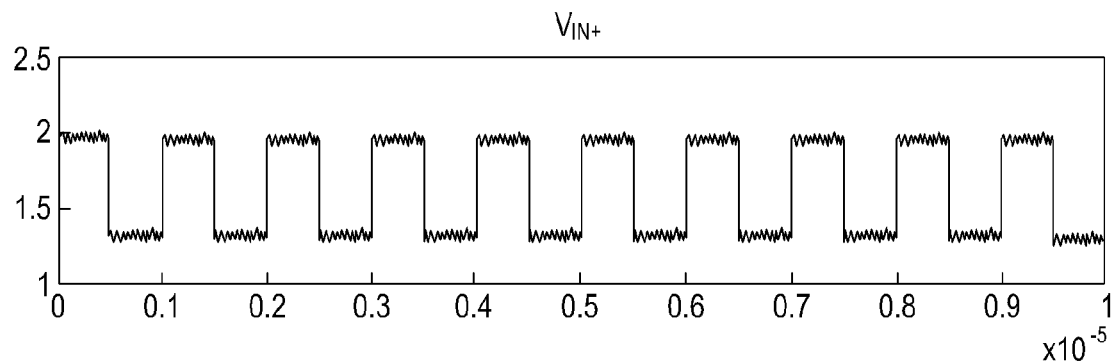
FIGS. 6B and 6C illustrate waveforms of two differential signals.
Figure 6C:
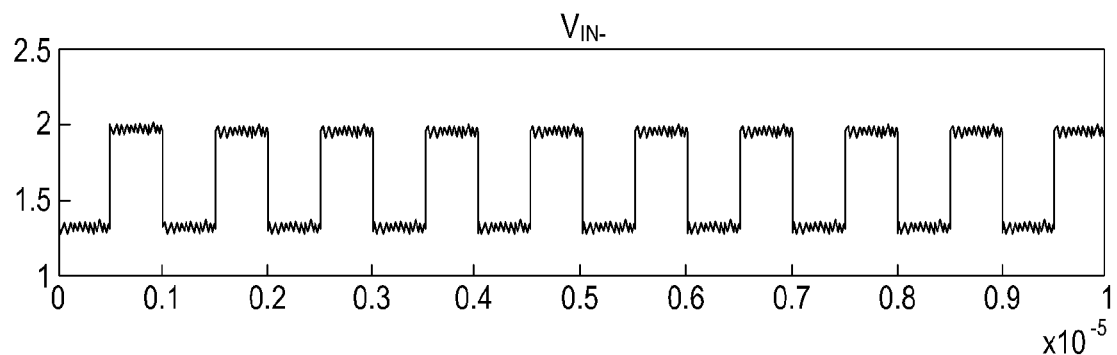

As illustrated in FIG. 6A, the differential rectifying unit receives two differential signals VIN+ and VIN−, and outputs two rectified signals VOUT+ and VOUT−. FIGS. 6B and 6C are examples of graphs of waveforms of two differential signals VIN+ and VIN−. As illustrated in FIGS. 6B and 6C, the two differential signals VIN+ and VIN− have a waveform of a square wave, and a sum of the two differential signals VIN+ and VIN− is a single ended signal of a constant value. The differential rectifying unit rectifies the two differential signals VIN+ and VIN−, and outputs two rectified signals VOUT+ and VOUT− having constant values.

Figure 6D:
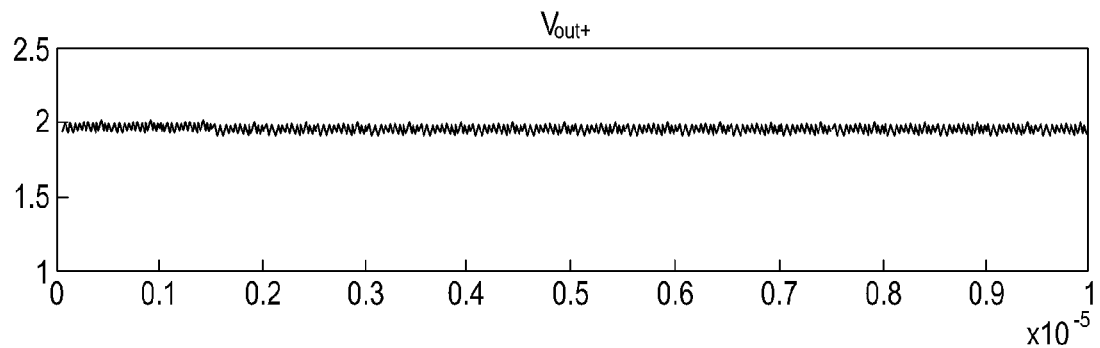
FIGS. 6D and 6E illustrate waveforms of two rectified signals according to an embodiment of the present invention.
Figure 6E:
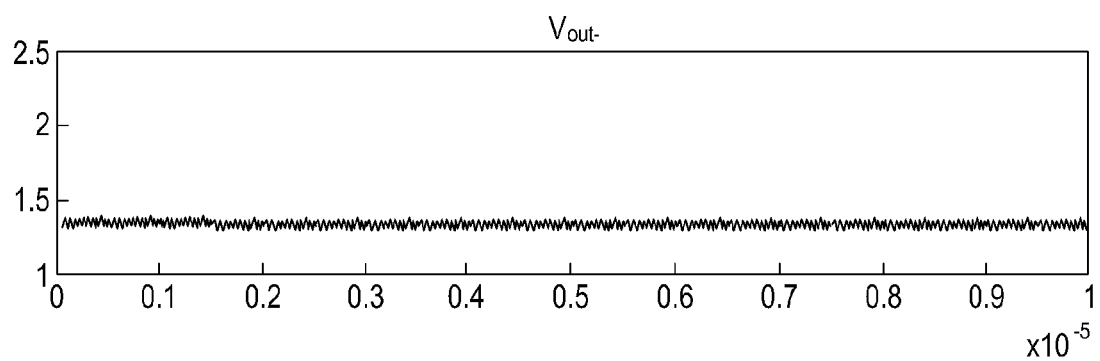

FIGS. 6D and 6E illustrate waveforms of two rectified signals according to an embodiment of the present invention. FIG. 6D illustrates a rectified waveform formed by extracting a high-level signal from among the differential signals of FIGS. 6B and 6C, and FIG. 6E illustrates a rectified waveform formed by extracting a low-level signal from among the differential signals of FIGS. 6B and 6C. As illustrated in FIGS. 6D and 6E, each of the two rectified signals VOUT+ and VOUT− is in a waveform having a voltage of a constant value.

A calculator 557, illustrated in FIG. 5, determines an input point of a pen input based on a difference in voltage values between the two rectified signals VOUT+ and VOUT−. For example, the calculator 557 determines a point where the difference in values between the two rectified signals VOUT+ and VOUT− is maximum, to be an input point. To accurately perform this determination, the calculator 557 interpolates a histogram associated with a difference in a plurality of voltage values. The architecture that determines an input point based on a result of interpolation on a histogram is a well-known technology and thus, detailed descriptions thereof will be omitted.

As described in the foregoing, the location determining unit 550 accurately determines an input point using a differential signal and minimizes noise, unlike the conventional architecture that determines an input point using a single-ended signal.

Figure 7:
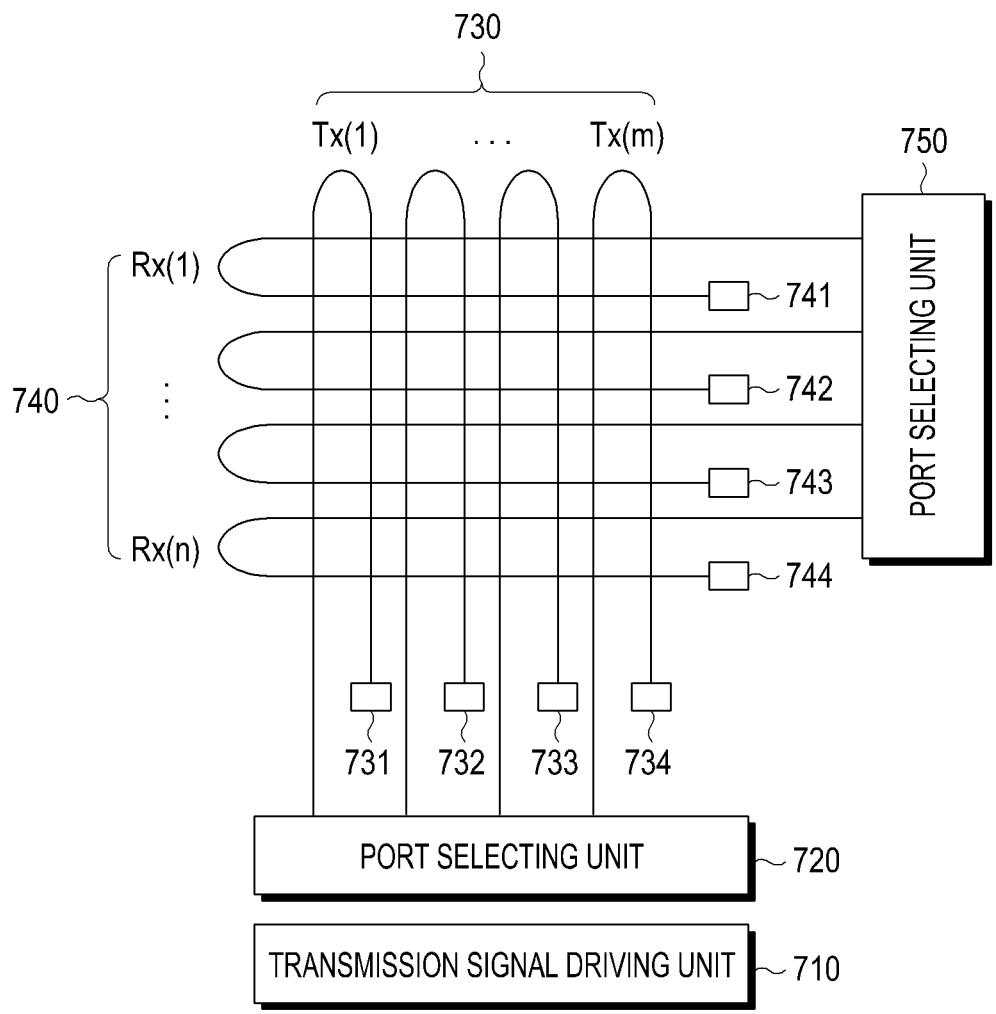
FIG. 7 illustrates a sensing apparatus according to another embodiment of the present invention.

FIG. 7 illustrates a sensing apparatus according to another embodiment of the present invention. The sensing apparatus of FIG. 7 includes a switch 731, 732, 733, 734, 741, 742, 743, or 744 disposed at one end of each of a plurality of loops of the transmitting sub-loop unit 730 and the receiving sub-loop unit 740, unlike the sensing apparatus of FIG. 4A or FIG. 4B.

The sensing apparatus opens the switches 731, 732, 733, 734, 741, 742, 743, and 744 during a first period in which a finger touch is sensed, so that the plurality of loops Tx(1), . . . , Tx(m),Rx(1), . . . , Rx(n) are not connected to a ground contact part. During a second period in which a pen input is sensed, the sensing apparatus closes the switches 731, 732, 733, 734, 741, 742, 743, and 744, so that the plurality of loops Tx(1), . . . , Tx(m) of the transmitting sub-loop unit 730 are connected to the ground contact part. Also, the sensing apparatus connects the plurality of loops Rx(1), . . . , Rx(n) of the receiving sub-loop unit 740 to the ground contact part, during the second period.

In the sensing apparatus of FIG. 7, each of the plurality of loops Tx(1), . . . , Tx(m),Rx(1), . . . , Rx(n) is separated from one another and thus, provides an isolation effect in which a transmission signal does not affect to the plurality of loops Tx(1), . . . , Tx(m),Rx(1), . . . , Rx(n) through a line to which the plurality of loops Tx(1), . . . , Tx(m),Rx(1), . . . , Rx(n) are commonly connected.

Figure 8A:
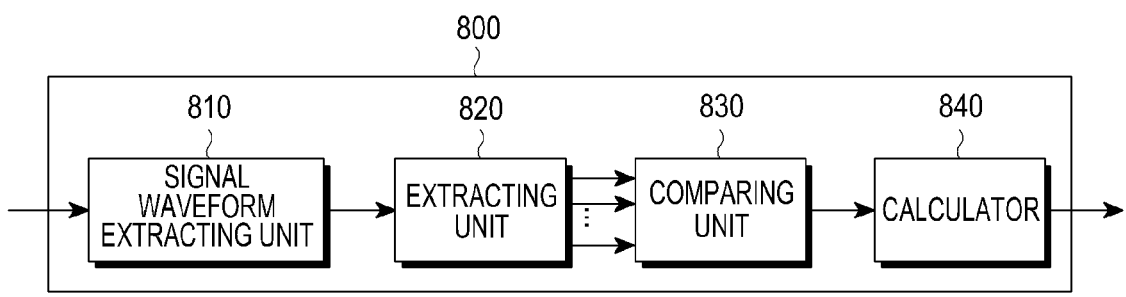
FIG. 8A illustrates a frequency determining unit according to an embodiment of the present invention.

FIG. 8A illustrates a frequency determining unit according to an embodiment of the present invention.

The frequency determining unit 800 includes a signal waveform extracting unit 810, a delay unit 820, a comparing unit 830, and a calculator 840.

Figure 8B:
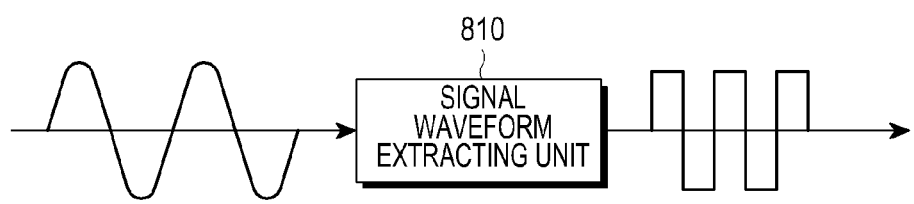
FIG. 8B illustrates a function of a signal waveform extracting unit according to an embodiment of the present invention.

FIG. 8B illustrates a function of the signal waveform extracting unit 810 according to an embodiment of the present invention. The signal waveform extracting unit 810 receives an input of a reception signal provided in a sine waveform, and converts the reception signal in the sine waveform into a signal in a form of a square wave and outputs the signal in the form of the square wave. The signal waveform extracting unit 810 may sample, for example, the input reception signal so as to classify an offset, such as a sampling section greater than or equal to 0 as a positive (+) section and a sampling section less than or equal to the offset as a negative (−) section, and converts the reception signal into a signal in a form of a square waveform. The signal waveform extracting unit 810 is embodied as, for example, a quantizing module, and those skilled in the art will readily understand that any unit that is capable of converting a reception signal in a sine waveform into a signal in a form of a square wave may be used.

Figure 8C:
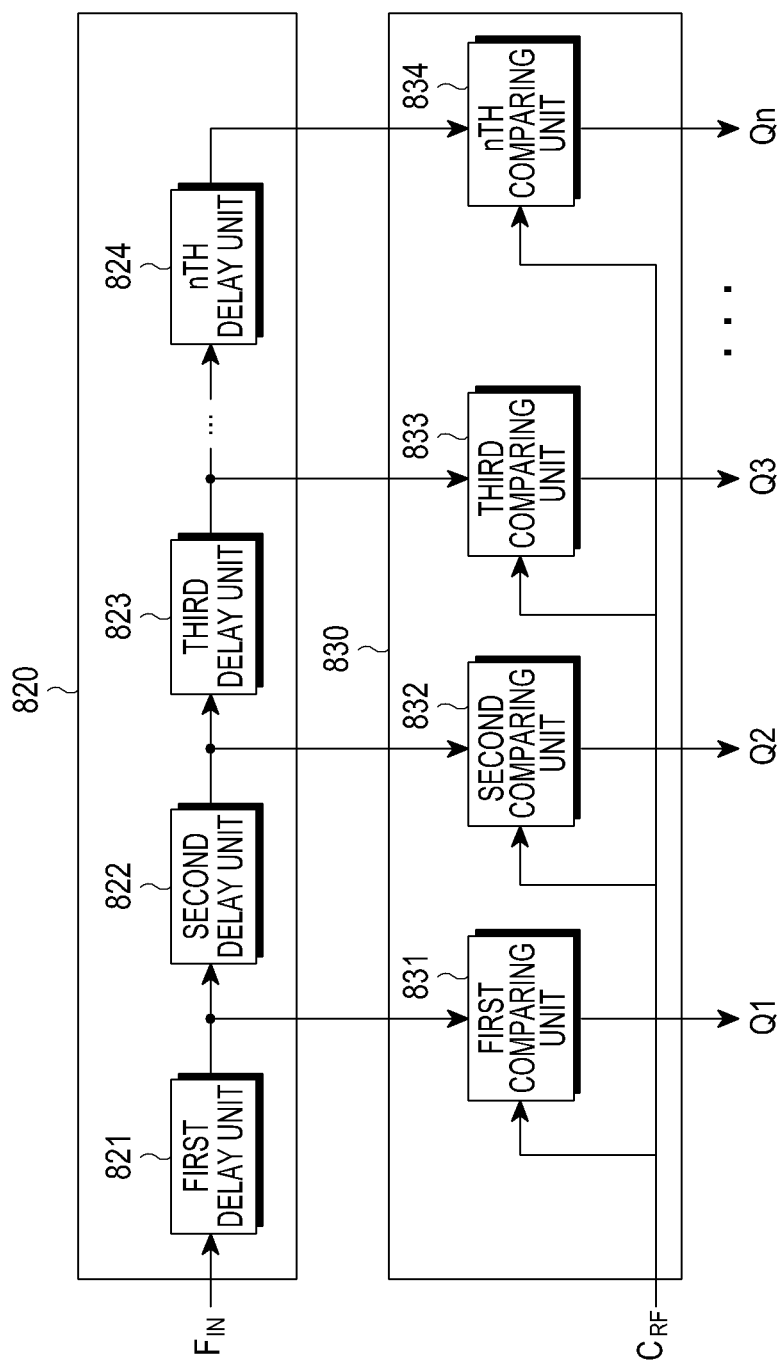
FIG. 8C illustrates an example of a delay unit and a comparing unit according to an embodiment of the present invention.

FIG. 8C illustrates an example of the delay unit 820 and the comparing unit 830 according to an embodiment of the present invention. The delay unit 820 includes a first delay unit 821, a second delay unit 822, a third delay unit 823, . . . , and an $n^{th}$ delay unit 824. The comparing unit 830 includes a first comparing unit 831, a second comparing unit 832, a third comparing unit 833, . . . , and an $n^{th}$ comparing unit 834.

The delay unit 820 receives an input of a reception signal $F_{IN}$. The first delay unit 821 delays the reception signal $F_{IN}$ by a phase, and outputs the delayed reception signal to the first comparing unit 831. The second delay unit 822 delays the reception signal $F_{IN}$ by a phase and outputs the delayed reception signal $F_{IN}$ to the second comparing unit 832, the third delay unit 823 delays the reception signal $F_{IN}$ by a phase and outputs the delayed reception signal $F_{IN}$ to the third comparing unit 833, and the $n^{th}$ delay unit 824 delays the reception signal $F_{IN}$ by a phase and outputs the delayed reception signal $F_{IN}$ to the $n^{th}$ comparing unit 834.

The first comparing unit 831 compares the delay signal input from the first delay unit 821 with a reference signal $C_{RF}$ and outputs a comparison result as a binary value Q1. The second comparing unit 832 compares the delay signal input from the second delay unit 822 with the reference signal $C_{RF}$ and outputs a comparison result as a binary value Q2. The third comparing unit 833 compares the delay signal input from the third delay unit 823 with the reference signal $C_{RF}$ and outputs a comparison result as a binary value Q3, and the $n^{th}$ comparing unit 834 compares the delay signal input from the $n^{th}$ delay unit 824 with the reference signal $C_{RF}$ and outputs a comparison result as a binary value Qn.

The calculator 840 determines information associated with a phase of the reception signal based on a plurality of binary values Q1, Q2, Q3, and Qn input from the comparing unit 830. The calculator 840 determines a change in a frequency based on the information associated with the phase of the reception signal. The architecture that determines a touch pressure based on information associated with a frequency of a reception signal is a well-known technology and thus, detailed descriptions thereof will be omitted.

Figure 8D:
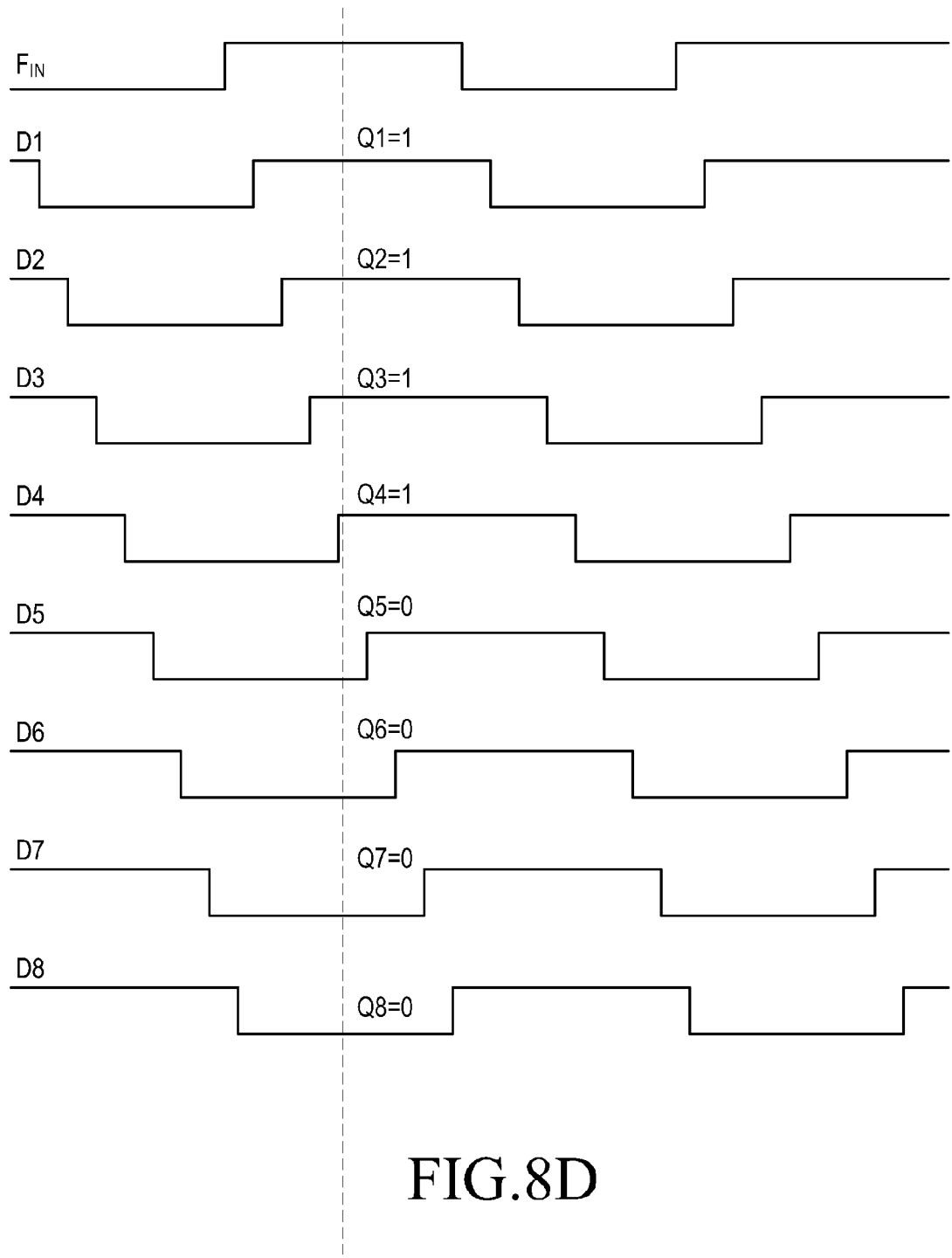
FIG. 8D illustrates the obtaining of information associated with a phase of a reception signal based on a binary value associated with a comparison result according to an embodiment of the present invention.

FIG. 8D illustrates obtaining information associated with a phase of a reception signal based on a binary value associated with a comparison result according to an embodiment of the present invention.

In FIG. 8D, a reception signal $F_{IN}$ corresponds to a square wave. A delay unit includes first through eighth delay units and thus, first through eight delay signals D1 through D8 are generated. A first comparing unit through an eighth comparing unit compare the delay signals D1 through D8 with a reference signal or a reception signal, respectively, and output a comparison result as a binary signal of 11110000. A calculator determines phase information of the reception signal FIN or information associated with a change in a frequency based on the binary signal of 11110000, and determines a touch pressure of a pen corresponding to the change in the frequency based on the described information.

FIGS. 9A through 9D illustrate sensing timings of a finger touch input and a pen input according to embodiments of the present invention.

Figure 9A:
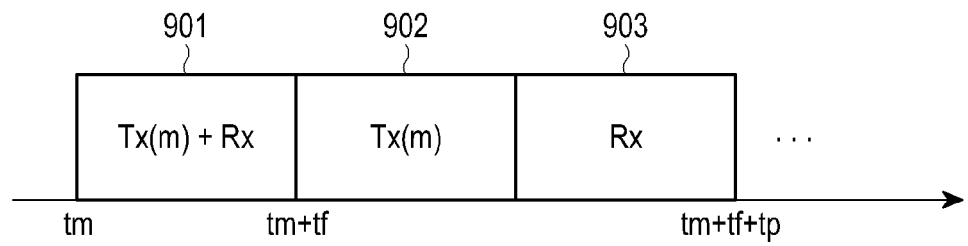
FIGS. 9A through 9D illustrate sensing timings of a finger touch input and a pen input according to embodiments of the present invention.

FIG. 9A illustrates a sensing apparatus that uses, as a medium, an EMR pen that excludes a power source. The sensing apparatus may simultaneously operate a transmitting sub-loop unit Tx(m) and a receiving sub-loop unit Rx during a finger touch input sensing period 901. The sensing apparatus applies, to the transmitting sub-loop unit Tx(m), a transmission signal for transmission signal induction during a pen input sensing period 902. The sensing apparatus performs controlling so as to receive a reception signal from the receiving sub-loop unit Rx during a pen input sensing period 903.

Figure 9B:
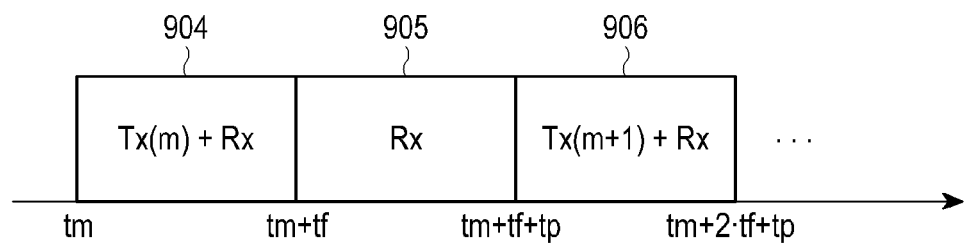

FIG. 9B illustrates a sensing apparatus that uses, as a medium, an EMR pen including a power source, which outputs self-induced electromagnetism. Thus, the architecture in which the sensing apparatus applies a transmission signal to a transmitting sub-loop unit for electromagnetism induction is not required. The sensing apparatus may simultaneously operate a transmitting sub-loop unit Tx(m) and a reception sub-loop unit Rx during a finger touch input sensing period 904. The sensing apparatus may operate only the reception sub-loop unit Rx during a pen touch input sensing period 905. The sensing apparatus may simultaneously operate a transmitting sub-loop unit Tx(m+1) and the receiving sub-loop unit Rx during a subsequent finger touch input sensing period 906.

Figure 9C:
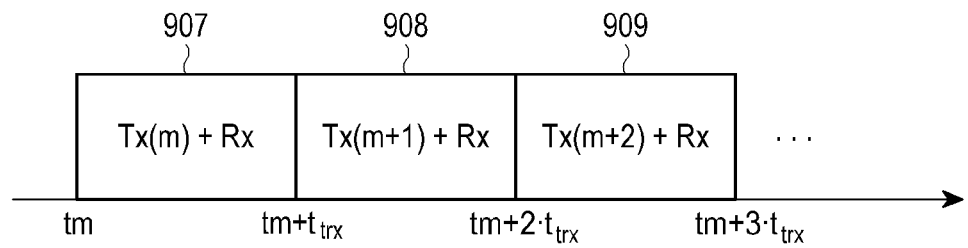

FIG. 9C illustrates a sensing apparatus that simultaneously senses a finger touch input and a pen input. A pen used as a medium in FIG. 9C outputs an electric field. The sensing apparatus may simultaneously operate a transmitting sub-loop unit Tx(m) and a receiving sub-loop unit Rx during a finger touch input and a pen input sensing period 907, the transmitting sub-loop unit Tx(m) and the receiving sub-loop unit Rx during a subsequent sensing period 908, and the transmitting sub-loop unit Tx(m) and the receiving sub-loop unit Rx during a subsequent sensing period 909. The sensing apparatus distinguishes an electromagnetic wave from a pen and an electric field from the transmitting sub-loop unit based on a difference of a frequency, and determines an input location of the pen input, a touch pressure, and a finger touch input.

Figure 9D:
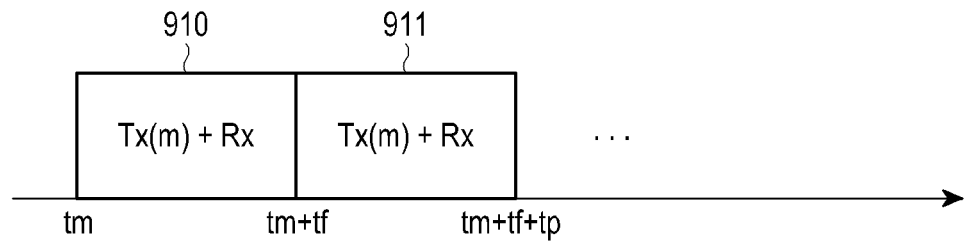

FIG. 9D illustrates a sensing apparatus that uses, as a medium, a pen that outputs an electric field. The sensing apparatus may simultaneously operate a transmitting sub-loop unit Tx(m) and a receiving sub-loop unit Rx during a finger touch input period 910. The sensing apparatus may simultaneously operate the transmitting sub-loop unit Tx(m) and the receiving sub-loop unit Rx during a pen input period 911, the transmitting sub-loop unit Tx(m) and the receiving sub-loop unit Rx during a subsequent finger touch input period 912, and the transmitting sub-loop unit Tx(m) and the receiving sub-loop unit Rx during a subsequent pen input period 913. In the embodiment of FIG. 9D, the sensing apparatus may simultaneously operate the transmitting sub-loop unit and the receiving sub-loop unit since an input from the pen is an electric field. When the pen generates an electric field by itself, the sensing apparatus may not operate the transmitting sub-loop unit during the pen input periods 911 and 913, and may operate only the receiving sub-loop unit, such as to detect a location of the pen, a contact, or a contact pressure.

Figure 10A:
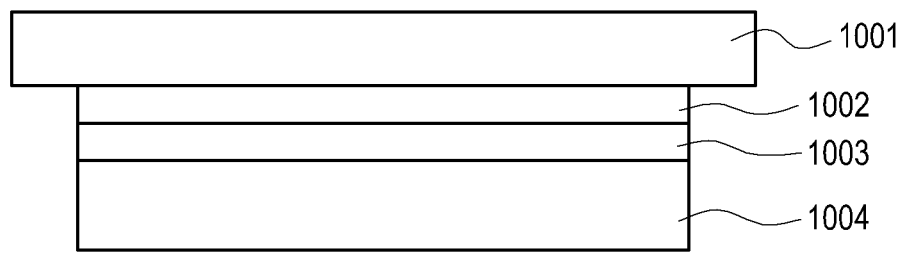
FIGS. 10A through 10C illustrate a package including a sensing apparatus according to embodiments of the present invention.

FIG. 10A illustrates a package including a sensing apparatus according to embodiments of the present invention. Two electrodes are disposed in order of a first electrode 1002 and a second electrode 1003, as illustrated in FIG. 10A. In the entire package, the first electrode 1002 and the second electrode 1003 are disposed under a protective glass 1001, and a display module 1004 is disposed under the second electrode 1003.

Figure 10B:
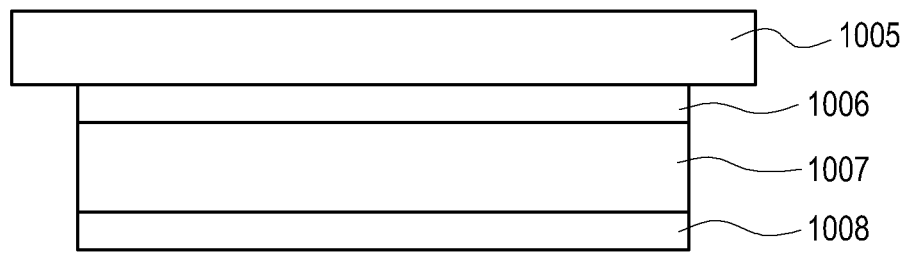

FIG. 10B illustrates a modified example. A first electrode 1006 is disposed under a protective glass 1005, a display module 1007 is disposed under the first electrode 1006, and a second electrode 1008 is disposed under the display module 1007.

Figure 10C:
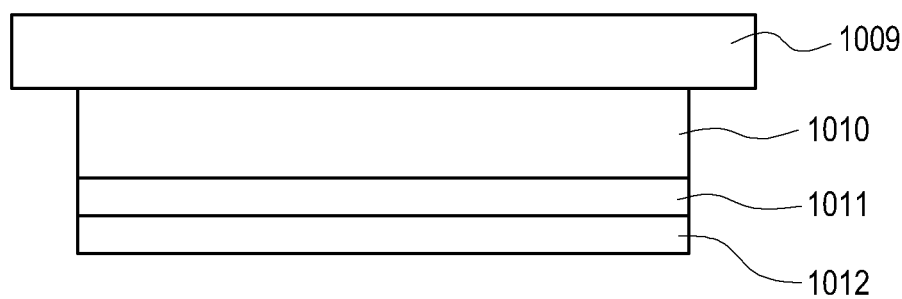

FIG. 10C illustrates another modified example. A display module 1010 is disposed under a protective glass 1009, and a first electrode 1011 and a second electrode 1012 are sequentially disposed under the display module 1010.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A sensing apparatus, comprising:
   a sensing loop that comprises a plurality of loops, wherein each of the plurality of loops receives an electromagnetic field from a pen and outputs a single-ended reception signal;
   a converter that converts the single-ended reception signal into two differential signals that are inverted to each other;
   a rectifier that comprises two input ends each receiving each of the two differential signals and two output ends, rectifies the each of the two differential signals, and outputs two rectified signals; and
   a controller that determines an input point of the pen based on a voltage difference between the two rectified signals.

2. The sensing apparatus of claim 1, further comprising:
   an amplifier that amplifies the single-ended reception signal and outputs to the converter;
   a low-pass filter that performs low-pass filtering on the two differential signals; and
   an analog-to-digital converter that performs analog-to-digital converting on the two low-pass filtered differential signals and outputs the converted signals to the controller.

3. The sensing apparatus of claim 1, wherein the controller determines a point where the voltage difference between the two rectified signals is maximum, to be the input point of the pen.

4. The sensing apparatus of claim 1, wherein the controller interpolates a histogram associated with the voltage difference for the each of the plurality of loops and determines the input point of the pen based on a result of the interpolation.

5. The sensing apparatus of claim 1,
wherein the controller determines a frequency of the single-ended reception signal.

6. The sensing apparatus of claim 5, further comprising a first delay unit that delays the single-ended reception signal and a second delay unit that further delays the delayed single-ended reception signal from the first delay unit.

7. The sensing apparatus of claim 6, further comprising:
a first comparing unit that compares the delayed single-ended reception signal with a reference signal and outputs a first binary value according to the comparison result of the first comparing unit, and
a second comparing unit that compares the further delayed single-ended reception signal with the reference signal and outputs a second binary value according to the comparison result of the second comparing unit.

8. The sensing apparatus of claim 7, wherein the controller determines a change in the frequency of the single-ended signal based on the first binary value and the second binary value.

9. The sensing apparatus of claim 5, wherein the controller determines an input pressure of the pen based on the determined frequency of the single-ended reception signal.

10. A method for controlling a sensing apparatus comprising a plurality of loops, wherein each of the plurality of loops receives an electromagnetic field from a pen and outputs a single-ended reception signal, the method comprising:
receiving the electromagnetic field from the pen and outputting the single-ended reception signal;
converting the single-ended reception signal into two differential signals that are inverted to each other;
rectifying each of the two differential signals and outputting two rectified signals; and
determining an input point of the pen based on a voltage difference between the two rectified signals.

11. The method of claim 10, further comprising:
amplifying the single-ended reception signal;
performing low-pass filtering on the two differential signals; and
performing analog-to-digital converting on the two low-pass filtered differential signals.

12. The method of claim 10, wherein determining the input point of the pen comprises:
determining a point where the voltage difference between the two rectified signals is maximum, to be the input point of the pen.

13. The method of claim 10, wherein determining the input point of the pen comprises:
interpolating a histogram associated with the voltage difference for the each of the plurality of loops; and
determining the input point of the pen based on a result of the interpolation.

14. The method of claim 10, further comprising:
determining frequency of the single-ended reception signal.

15. The method of claim 14, further comprising:
delaying the single-ended reception signal; and
further delaying the delayed single-ended reception signal.

16. The method of claim 15, further comprising:
comparing the delayed single-ended reception signal with a reference signal and outputting a first binary value according to the comparison result between the delayed single-ended reception signal and the reference signal; and
comparing the further delayed single-ended reception signal with the reference signal and outputting a second binary value according to the comparison result between the further delayed single-ended reception signal and the reference signal.

17. The method of claim 16, further comprising:
determining a change in the frequency of the single-ended signal based on the first binary value and the second binary value.

18. The method of claim 14, further comprising:
determining input pressure of the pen based on the determined frequency of the single-ended reception signal.

* * * * *